US011233799B1

(12) United States Patent
Whyte et al.

(10) Patent No.: US 11,233,799 B1
(45) Date of Patent: Jan. 25, 2022

(54) SCAN TO LOGIN

(71) Applicant: Snap Inc., Santa Monica, CA (US)

(72) Inventors: David Whyte, Toronto (CA); Matthew Colin Grantham, Toronto (CA); Patrick Mandia, Venice, CA (US); Hongjai Cho, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 156 days.

(21) Appl. No.: 16/798,053

(22) Filed: Feb. 21, 2020

Related U.S. Application Data

(60) Provisional application No. 62/908,352, filed on Sep. 30, 2019.

(51) Int. Cl.
*H04L 29/06* (2006.01)
*G06F 16/955* (2019.01)

(52) U.S. Cl.
CPC ........ *H04L 63/102* (2013.01); *G06F 16/9566* (2019.01); *H04L 63/0853* (2013.01)

(58) Field of Classification Search
None
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz et al. |
| 8,199,747 B2 | 6/2012 | Rojas et al. |
| 8,332,475 B2 | 12/2012 | Rosen et al. |

(Continued)

FOREIGN PATENT DOCUMENTS

CA    2887596    7/2015

OTHER PUBLICATIONS

"U.S. Appl. No. 16/671,800, Non Final Office Action dated Nov. 27, 2020", 14 pgs.

(Continued)

*Primary Examiner* — Cai Y Chen
(74) *Attorney, Agent, or Firm* — Schwegman Lundberg & Woessner, P.A.

(57) ABSTRACT

Systems and methods are provided for performing operations including receiving, by a messaging application server from a third-party application implemented on a first device, a request to generate a registration code to enable the third-party application to access user profile information stored on the messaging application server; generating, by the messaging application server, the registration code; causing, by one or more processors, the first device to display a representation of the registration code; receiving, by the messaging application server from a messaging application implemented on a second device, a request to authorize access to the user profile based on the representation that is displayed on the first device; and authorizing, by the messaging application server, the third-party application implemented on the first device to access the user profile information maintained by, the messaging application server in response to receiving the request from the messaging application.

19 Claims, 10 Drawing Sheets

(56) References Cited

U.S. PATENT DOCUMENTS

| | | |
|---|---|---|
| 8,392,975 B1 | 3/2013 | Raghunath |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,781,132 B2 | 10/2017 | Ramakrishnan |
| 9,805,182 B1 | 10/2017 | Kayyidavazhiyil et al. |
| 9,985,786 B1 | 5/2018 | Bhabbur et al. |
| 10,164,975 B1 | 12/2018 | Son et al. |
| 10,462,118 B2 | 10/2019 | Ren |
| 10,498,730 B1 | 12/2019 | Son et al. |
| 10,521,623 B2 * | 12/2019 | Rodriguez .............. H04L 63/08 |
| 11,063,937 B1 | 7/2021 | Son et al. |
| 2007/0112968 A1 | 5/2007 | Schwab |
| 2008/0127331 A1 | 5/2008 | Seidman et al. |
| 2010/0042669 A1 | 2/2010 | Cohen et al. |
| 2011/0202598 A1 | 8/2011 | Evans et al. |
| 2012/0209924 A1 | 8/2012 | Evans et al. |
| 2013/0031623 A1 | 1/2013 | Sanders |
| 2013/0124292 A1 | 5/2013 | Juthani |
| 2013/0124855 A1 | 5/2013 | Varadarajan et al. |
| 2014/0075551 A1 | 3/2014 | Heo |
| 2014/0282961 A1 | 9/2014 | Dorfman et al. |
| 2014/0372303 A1 | 12/2014 | Gafni |
| 2015/0156198 A1 | 6/2015 | Sabin et al. |
| 2015/0310251 A1 | 10/2015 | Wyrwas et al. |
| 2016/0156635 A1 * | 6/2016 | Liu ....................... H04W 4/029 726/4 |
| 2016/0188859 A1 | 6/2016 | Lee et al. |
| 2016/0314462 A1 | 10/2016 | Hong et al. |
| 2020/0253400 A1 * | 8/2020 | Born .................. A47G 19/2261 |

OTHER PUBLICATIONS

"U.S. Appl. No. 16/671,800, Response filed Feb. 12, 21 to Non Final Office Action dated Nov. 27, 2020", 11 pgs.

"U.S. Appl. No. 15/085,033, Non Final Office Action dated Nov. 16, 2017", 12 pgs.

"U.S. Appl. No. 15/085,033, Examiner Interview Summary dated Jan. 19, 2018", 3 pgs.

"U.S. Appl. No. 15/085,033, Response filed Feb. 13, 2018 to Non Final Office Action dated Nov. 16, 2017", 12 pgs.

"U.S. Appl. No. 15/085,033, Final Office Action dated May 23, 2018", 16 pgs.

"U.S. Appl. No. 15/085,033, Response filed Jul. 23, 2018 to Final Office Action dated May 23, 2018", 14 pgs.

"U.S. Appl. No. 15/085,033, Notice of Allowance dated Aug. 2, 2018", 5 pgs.

"U.S. Appl. No. 16/186,236, Notice of Allowance dated Aug. 8, 2019", 11 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

U.S. Appl. No. 15/085,033/U.S. Pat. No. 10,164,975, filed Mar. 30, 2016, Authentication Via Camera.

U.S. Appl. No. 16/186,236/U.S. Pat. No. 10,498,730, filed Nov. 9, 2018, Authentication Via Camera.

U.S. Appl. No. 16/671,800, filed Nov. 1, 2019, Authentication Via Camera.

"U.S. Appl. No. 16/671,800, Notice of Allowance dated Mar. 10, 2021", 8 pgs.

* cited by examiner

SCAN TO LOGIN

CROSS-REFERENCE TO RELATED APPLICATION

This application claims the benefit of priority of U.S. Provisional Patent Application No. 62/908,352, entitled "SCAN TO LOGIN," filed on Sep. 30, 2019, the entirety of which is hereby incorporated by reference herein.

TECHNICAL FIELD

The present disclosure relates generally to authenticating applications using a messaging application.

BACKGROUND

Messaging applications typically store a variety of information about each user in a user profile. Sometimes, such information is useful in other contexts and other applications that may be implemented on other devices. Users are always seeking new ways to simplify how such information is transferred between applications and devices.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
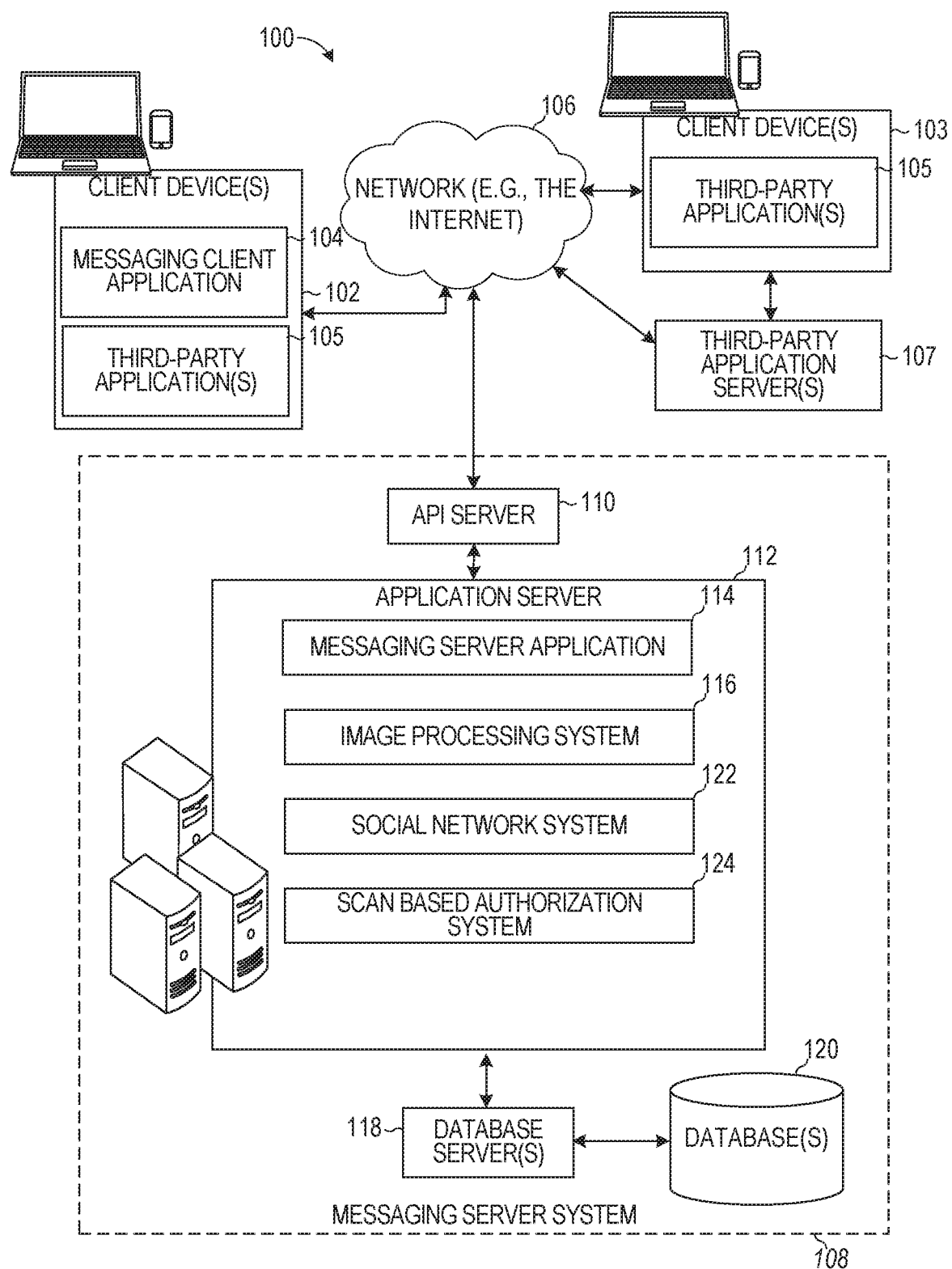
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, messaging applications, implemented on mobile devices, store information about each of their users in respective user profiles. In some instances, an application implemented on another device, such as a gaming console, may benefit from accessing the user profile information for a given user. For example, a gaming application implemented on a gaming console ma benefit from obtaining a user's avatar that is stored by the messaging application implemented on the user's mobile phone. Current systems fail to enable a user to seamlessly transfer the information from the messaging application to the gaming application. The typical system requires the user to go through multiple steps and screens after logging into the messaging application to select certain profile information to retrieve. Even then, the user has to manually input the retrieved profile information into the gaming application. Some systems allow the user to provide the user's credentials of the messaging application to the gaming application to allow the g application to retrieve user profile information from the messaging application. While such approaches reduce some user interaction, security of the users' credentials is compromised and exposes the users to various security risks. As such, these steps for sharing profile information between applications and devices decrease security and increase the overall complexity experienced by the users. As a result, end users become frustrated, security is subject to being compromised, and valuable information goes unused, which wastes device resources.

The disclosed embodiments improve the efficiency of using the electronic device by providing a scan to login system that provides a seamless way for users to authorize a messaging application, implemented on a first user device, to share user profile information with a third-party application, implemented on a second user device, such as a gaming console. The third-party application is provided by an entity or organization that differs from the entity or organization that provides the messaging application. Specifically, a third-party application receives a graphic representation associated with a unique registration code from a messaging application server. The third-party application displays the graphic representation of the unique registration code on a display device, such as a television. The messaging application implemented on a mobile device of the user captures an image of the graphic representation. The messaging application uses a universal resource locator (URL) associated with the graphic representation to access the registration code to authorize the third-party application to access user profile information for the user from the messaging application server.

After the messaging application accesses the registration code and receives confirmation from the user to authorize the third-party application, the messaging application provides authorization information to a server of the third-party application identified by a universal resource identifier (URI) associated with the registration code. The server of the third-party application accesses the messaging application server to receive an authentication token for accessing the user profile using the authorization information. The server of the third-party application then sends the token to the second user device, which enables the third-party application implemented on the second device to access the profile information from the messaging application server.

As such, the disclosed embodiments allow the user to authorize access to the user profile to the third-party application, implemented on another device, without inputting messaging application credentials into the third-party application or manually selecting and retrieving the information to share with the third-party application from the messaging application. Namely, the user is already logged into the messaging application on the mobile device and simply captures an image of the graphic representation that is displayed by the second device. The capturing of the image of the graphic representation triggers an automated and seamless authorization process by which the third-party application is provided access to the user profile stored by the messaging application server without ever requiring the user to input credentials.

In this way, the disclosed embodiments improve the efficiency of using the electronic device by reducing the number of screens and interfaces a user has to navigate through to have profile information shared between applications and devices by simply capturing an image of a graphic representation displayed on a screen. This enhances the security of the user's credentials and ease of logging into applications. This also reduces the device resources (e.g., processor cycles, memory, and power usage) needed to accomplish a task with the device. The disclosed embodiments particularly enhance the security of the user's credentials by having a single point or server, that the user trusts, control and maintain the user's credentials, which are used to verify authenticity of the user.

FIG. 1 is a block diagram showing an example messaging system 100 for exchanging data (e.g., messages and associated content) over a network 106. The messaging system 100 includes multiple client devices 102 and 103, each of which hosts a number of applications. For example, client device 102 hosts a messaging client application 104 and a third-party application 105 and client device 103 hosts one or more third-party applications 105 (which may be the same or different from third-party application 105 hosted on client device 102). In one example, client device 102 may be a mobile device, such as a mobile phone, and client device 103 is a gaming console or smart television on which one or more third-party applications 105 that include gaming applications or functionality are implemented. Each messaging client application 104 is communicatively coupled to other instances of the messaging client application 104, the third-party applications 105, and a messaging server (messaging application server) system 108 via a network 106 (e.g., the Internet).

In some cases, the third-party applications 105 implemented on client device 103 are configured to communicate with one or more third-party application servers 107. Third-party application servers 107 implement backend functionality for managing profiles and gaming or third-party application data used by the third-party applications 105 implemented on the client device 103 or client device 102. The third-party applications 105 may communicate directly with the third-party application servers 107 and/or via network 106.

Accordingly, each messaging client application 104 and third-party application 105 is able to communicate and exchange data with another messaging client application 104 and third-party application(s) 105 and with the messaging server system 108 and/or third-party application server 107 via the network 106 and/or directly. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers, such as third-party application servers 107) from the messaging client application 104 to the third-party application(s) 105.

The third-party application(s) 105 and the messaging client application 104 are applications that include a set of functions that allow the client device 102 to access a scan based authorization system 124. The third-party application 105 is an application that is separate and distinct from the messaging client application 104 and, in some cases, is installed on a separate device, such as client device 103. The third-party application(s) 105 are downloaded and installed by the client device 102 and/or 103 separately from the messaging client application 104. In some implementations, the third-party applications 105 are downloaded and installed by the client device 102 before or after the messaging client application 104 is downloaded and installed.

The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can access user profile information of the messaging client application 104 when the user scans a representation of a registration code displayed by the third-party application 105 and without the user inputting other credentials (e.g., a username and password). After the user scans the representation of the registration code, and after the messaging client application 104 authorizes access to the user profile information maintained by the messaging client application 104, the third-party application 105 receives an access token for retrieving user profile information from the application server 112 of the messaging client application 104.

For example, the third-party application 105 is a gaming application implemented by client device 103, which is a gaming console. The gaming console requests that the scan based authorization system 124 generate a registration code by providing a URI and identification of the gaming application. The scan based authorization system 124 generates the registration code, associates the registration code with the URI and the identification of the gaming application, and provides a URL to the registration code. In some cases, the scan based authorization system 124 provides the URL in the form of a graphic image, such as a two-dimensional barcode, a custom graphic with encoded information, a three-dimensional barcode, or any other suitable form. The gaming application presents the representation of the registration code to a user on a display associated with the gaming application, such as on a television coupled to the gaming console.

The user using the client device 102 launches the messaging client application 104 and activates a login screen in which a camera of the client device 102 is enabled to begin capturing images. The user points the camera of the client device 102 at the representation of the registration code that is displayed on the television by the gaining console. The messaging client application 104 detects the representation and decodes the representation to retrieve the URL associated with the registration code. The messaging client application 104 accesses the registration code stored by the scan based authorization system 124 using the URL. The messaging client application 104 obtains the identification of the gaming application from the scan based authorization system 124 based on the URL. The messaging client application 104 presents a notification or prompt to the user with the identification of the gaming application and requests that the user confirm authorization to the gaining application to access the user profile of the messaging client application 104.

Once the user confirms or grants access by selecting an on-screen option, the messaging client application 104 performs an authorization process in accordance with the OATH 2.0 framework to authorize the gaming application. Specifically, the scan based authorization system 124 associates the user profile with the registration code and provides the URI of the gaming application server to the messaging client application 104. The messaging client application 104 obtains authorization information, including authorization token information, from the scan based authorization system 124. The messaging client application 104 provides the authorization information to the gaming application server via the URL of the gaming application server. The gaining application server communicates with the scan based authorization system 124 to retrieve an authorization token using the authorization information. The gaming application server provides the retrieved authorization token from the scan based authorization system 124 and provides the retrieved authorization token to the gaming application installed on the gaming console. The gaming application on the gaming console obtains portions of the user profile information that are stored on the messaging application server 112 using the authorization token. The user profile information may include an avatar of the user, a list of friends or contacts of the user, recent communications or messages exchanged between the user and the contacts, images or videos captured by the user using the messaging client application 104, and so forth.

For example, the gaming application retrieves an avatar of the user that is generated and maintained by the messaging application server 112 using the authorization token. The gaming application incorporates the retrieved avatar into a gaming graphical user interface of the gaming application implemented by the gaming console. In some embodiments, the messaging client application 104 invalidates or deletes the registration code by sending a message to the scan based authorization system 124 requesting that the registration code be invalidated or deleted. In response, the scan based authorization system 124 deactivates or deletes the registration code. This may be performed after the messaging client application 104 provides the authorization information to the gaming application server. In this way, future access to the registration code in case the representation of the registration code has been compromised is prevented. In some cases the authorization token provided to the gaming application is valid for a predetermined period of time (e.g., 24 hours). The gaming application server may refresh the token before the predetermined period of time elapses to extend the validity period of the authorization token for another predetermined period of time (e.g., for another 24 hours). In some cases, the authorization token allows the gaming application to retrieve the user profile information a single time and then immediately invalidates the token once the user profile information is retrieved to prevent further requests to the user profile information by the gaining application.

As an example, the third-party application 105 can be a social networking application, a dating application, a ride or car sharing application, a shopping application, a trading application, a gaming application, an imaging application, or any other suitable application.

In some embodiments, the authorization token includes information from a user account of the messaging client application 104. The authorization token may uniquely identify the third-party application 105 implemented on the client device 103 and may be associated with an expiration time. The third-party application 105 communicates with the authorization server to obtain the authorization token. Using the information contained in the authorization token (e.g., a username, a password, a user address, and so forth), the third-party application 105 is able to access features of the messaging client application 104.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and/or 103 and the application server 112. Specifically, the API server 110 provides a set of interfaces e.g., routines and protocols) that can be called or queried by the messaging client application 104 and the third-party application 105 in order to invoke functionality of the application server 112. The API server 110 exposes various functions supported by the application server 112, including account registration; registration code generation; authorization token access; login functionality; the sending of messages, via the application server 112, from a particular messaging client application 104 to another messaging client application 104 or third-party application 105; the sending of media files (e.g., images or video) from a messaging client application 104 to a messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the scan based authorization system 124. The messaging server application 114 implements a number of message processing technologies and functions, particularly related to the aggregation and other processing of content (e.g., textual and multimedia content) included in messages received from multiple instances of the messaging client application 104, As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the scan based authorization system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The scan based authorization system 124 manages authorization of third-party applications 105 using registration codes. In some embodiments, the scan based authorization system 124 manages the authorization in accordance with the OAuth 2 flow framework. The scan based authorization system 124 communicates with the third-party application server 107 to generate a registration code and representation of the registration code. The client device 103 presents the registration code representation to a user for the user to capture an image of the representation using the messaging client application 104. The scan based authorization system 124 receives from the messaging client application 104 an image of the registration code representation and/or a URL decoded from the displayed registration code. After the scan based authorization system 124 performs an authorization process to authorize the third-party application 105 in accordance with the OATH 2.0 framework and by receiving confirmation from the messaging client application 104, the scan based authorization system 124 transmits a communication to the messaging client application 104 to provide an authorization token to the third-party application server 107. The third-party application server 107 communicates with the scan based authorization system 124 to retrieve the authorization token and provides the retrieved token to the third-party application of the client device 103. The token enables the third-party application 105 of the client device 103 to access the user profile information of the messaging client application 104 without the user inputting credentials of the messaging client application 104 to the third-party application 105 of the client device 103.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data, or user profile information, that the first entity collects about various each of the users of a service provided by the first entity. For example, the user data and/or user profile information includes user names, phone numbers, passwords, addresses, friends, activity information, preferences, avatars, videos or content consumed by the user, and so forth.

Figure 2:
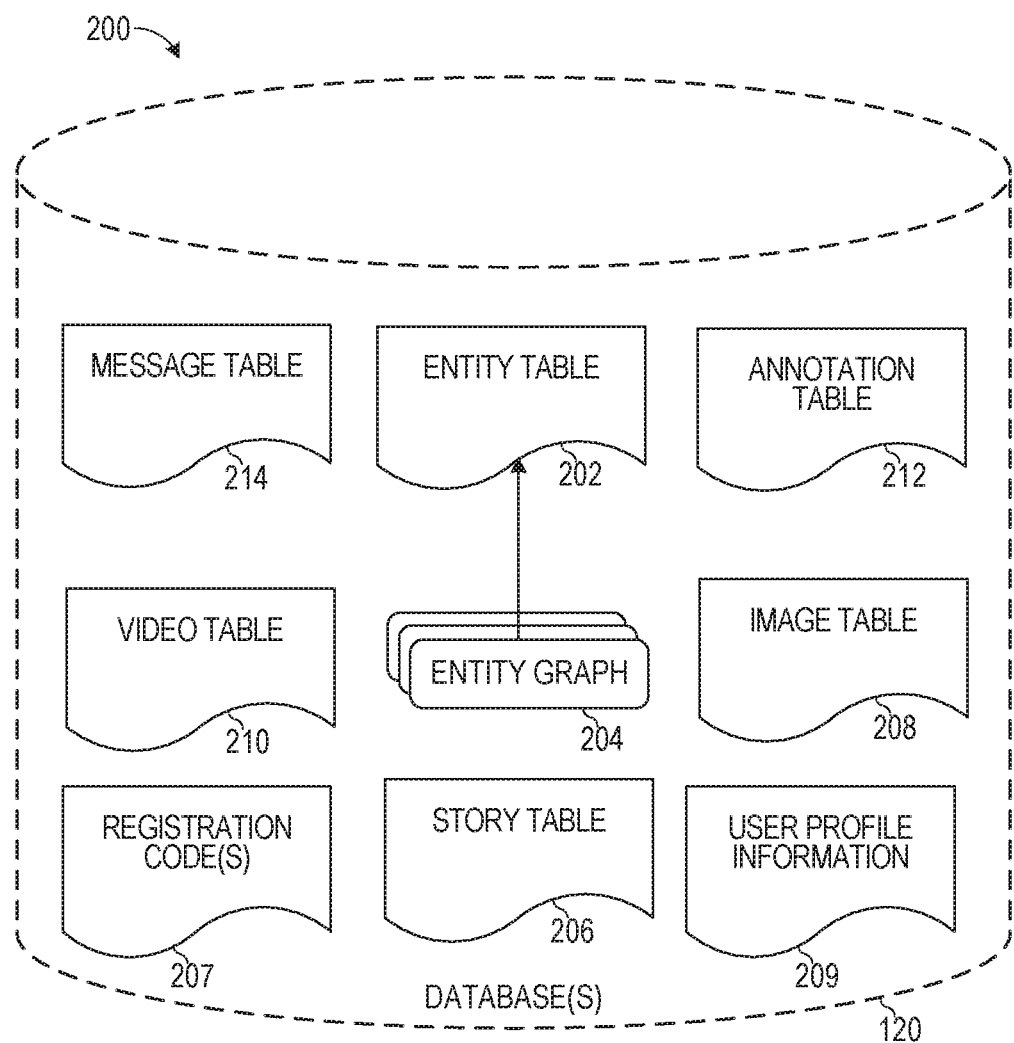
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Registration code(s) 207 stores one or more registration codes and/or representations of the registration code(s) 207. In some embodiments, each registration code stored in registration code(s) 207 is associated with an expiration time. After passage of the expiration time, the registration code is automatically deleted. Each registration code stored in registration code(s) 207 is referenced by a respective URL. The registration code includes a URI of a respective third-party application 105 that runs on a respective user device 103 and/or identifier information (e.g., a title) of the third-party application 105. The registration codes are generated and stored in registration code(s) 207 by the scan based authorization system 124 in response to receiving a request to generate the registration code from a given third-party application implemented on user device 103. In some cases, registration code(s) 207 stores one or more authorization tokens with respective expiration times. The authorization tokens are unique to specific third-party applications 105 and user profiles and enable the specific third-party applications 105 to access the user profile maintained by the messaging application server 112.

User profile information 209 stores information maintained by the messaging client application 104 for each user. The user profile information 209 includes an avatar of each user, a contact list or friends list of the user, one or more images or videos exchanged by the user with other users, communications exchanged by the user with other users, and so forth.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the user interface (UI) of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
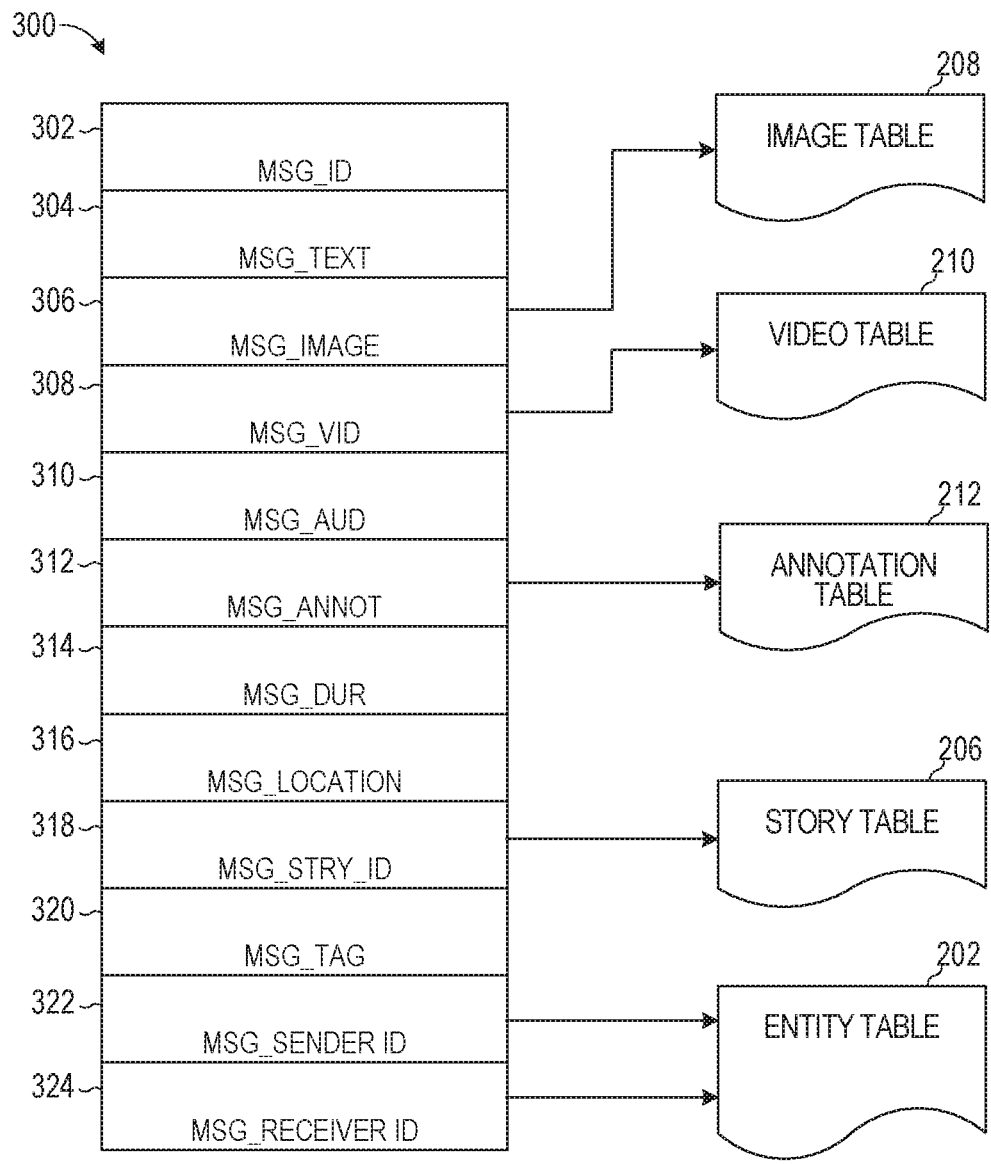
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may, be included within the message tag 320 that is indicative of the relevant animal. Tag values may be generated manually, based on user input, or may, be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
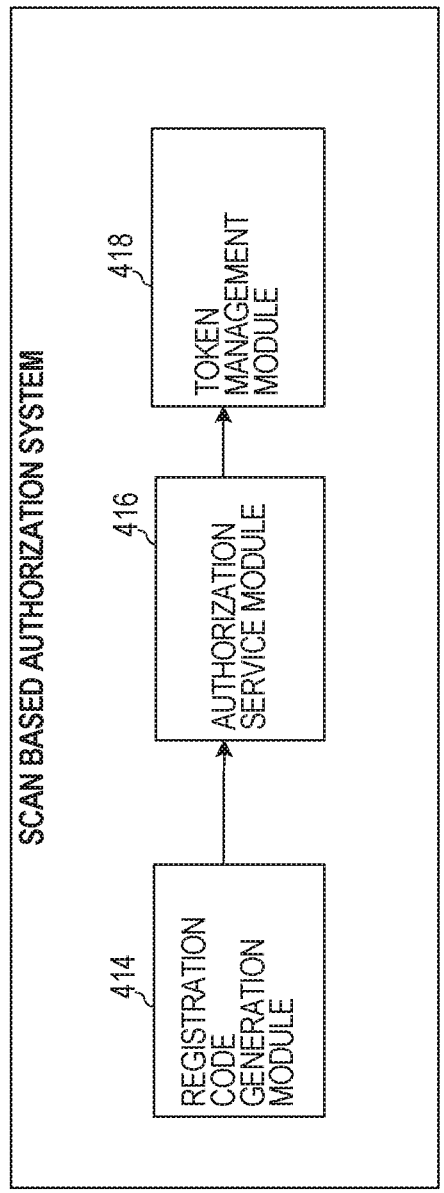
FIG. 4 is a block diagram showing an example scan based authorization system, according to example embodiments.

FIG. 4 is a block diagram showing an example scan based authorization system 124, according to example embodiments. Scan based authorization system 124 includes a registration code generation module 414, an authorization service module 416, and a token management module 418.

In some embodiments, the third-party application 105 implemented on client device 103 (e.g., a gaming console or smart television) may present a graphical user interface to the user. The graphical user interface may include an option for the user to request to have user profile information from another application, such as messaging client application 104, incorporated into the third-party application 105. In some cases, the third-party application 105 may automatically determine a need to incorporate the user profile information without soliciting input from the user via the graphical user interface. In some implementations, in response to receiving a user selection of the option, the third-party application 105 implemented on the client device 103 sends a request to the registration code generation module 414 to generate a registration code. The request may be sent to the registration code generation module 414 via the third-party application server 107 and may include a URI of the third-party application server 107 and a unique identifier of the third-party application 105.

The registration code generation module 414 may generate a unique registration code in response to receiving the request from the third-party application server 107. The unique registration code may be associated with a URL that points to the storage location of the unique registration code. The URL may be encoded in a graphic representation of the registration code (e.g., in a two-dimensional, three-dimensional, or custom barcode). The registration code may also be associated with the URI and unique identifier of the third-party application 105. The registration code generation module 414 stores the registration code in registration code(s) 207.

The registration code generation module 414 provides the URL and/or the graphic representation of the registration code to the third-party application server 107. The third-party application server 107 transmits the URL and/or the graphic representation to the third-party application 105 implemented on the client device 103. The third-party application 105 implemented on the client device 103 retrieves the graphic representation (if not already received) using the URL from the registration code generation module 414. After retrieving the graphic representation, the third-party application 105 implemented on the client device 103 presents the retrieved graphic representation on a display device of the client device 103. The third-party application 105 implemented on the client device 103 may present an on-screen overlay that includes the graphic representation with a message informing the user to scan the graphic representation using the camera feature of the messaging client application 104 of the client device 102. The message may indicate to the user that by scanning the graphic representation, the user can authorize the third-party application 105 implemented on the client device 103 to access user profile information of the user that is stored and maintained by the messaging client application 104.

The user may launch and log into the messaging client application 104 on the client device 102. The user may then activate the camera feature of the messaging client application 104. The user may point the camera of the client device 102 at the display screen of the client device 102 on which the graphic representation is presented. The messaging client application 104 detects the graphic representation and automatically decodes the URL that is encoded by the graphic representation. Once the URL is decoded, the messaging client application 104 accesses the registration code by communicating with the authorization service module 416. Specifically, the messaging client application 104 generates a request that includes a copy of the image with the graphic representation and/or generates a request to authorize the registration code associated with the decoded URL. The request is sent to the authorization service module 416.

In response to receiving the request from the messaging client application 104, the authorization service module 416 retrieves the registration code identified by the URL and/or that matches the image of the graphic representation provided by the messaging client application 104. The authorization service module 416 obtains the URI and the unique identifier of the third-party application 105 implemented on the client device 103 associated with the referenced registration code. The authorization service module 416 provides the obtained URI and the unique identifier to the messaging client application 104. The messaging client application 104 presents a graphical user interface with a notification to the user that includes the unique identifier of the third-party application 105. The notification provides an option for the user to select to authorize the third-party application 105 implemented on the client device 103 that is identified in the notification to access the user profile that is maintained by the messaging client application 104. In response to receiving a user selection of the option, the authorization service module 416 associates the registration code with the user profile of the user who is logged into the messaging client application 104.

The authorization service module 416 instructs the token management module 418 to generate an authorization token for the third-party application 105 implemented on the client device 103 and provides access credentials or authorization information to the messaging client application 104. The authorization token is associated with the user profile of the user who is logged into the messaging client application 104 and who authorized access to the user profile. In response to receiving the user selection of the option to authorize the third-party application 105 implemented on the client device 103, the messaging client application 104 transmits the credentials or authorization information received from the authorization service module 416 to the third-party application server 107. Specifically, the messaging client application 104 accesses the third-party application server 107 using the URI of the third-party application server 107 and communicates the credentials or authorization information. In some embodiments, after (or before) the messaging client application 104 provides the credentials or authorization information, the messaging client application 104 instructs the registration code generation module 414 to deactivate or delete the registration code that was generated. Specifically, the messaging client application 104 provides the URI, URL, unique identifier of the third-party application 105, and/or image of the representation of the registration code to the registration code generation module 414 with an instruction to deactivate or delete the registration code. Once the registration code is deleted, future access to the registration code by the messaging client application 104 is prevented. In some cases, the registration code is automatically deleted after a specified period of time (e.g., after 10 minutes).

The third-party application server 107 communicates with the token management module 418 to provide the credentials or authorization information to the token management module 418. In some embodiments, the token stored by the token management module 418 is associated with a URI or unique identifier of the third-party application 105 hosted on client device 103. In such cases, the third-party application server 107 provides the URI and/or unique identifier of the third-party application 105 hosted on client device 103. The token management module 418 returns the authorization token to the third-party application server 107. The third-party application server 107 provides the authorization token to the third-party application 105 implemented on the client device 103. The third-party application 105 implemented on the client device 103 prompts the user in the graphical user interface with an indication that the user profile of the messaging client application 104 is now made available and is being used by the third-party application 105 implemented on the client device 103.

Using the authorization token, the third-party application 105 implemented on the client device 103 retrieves portions of the user profile of the user from the messaging client application 104 and/or messaging client application server 112. For example, the third-party application 105 implemented on the client device 103 retrieves an avatar of the user from the messaging client application 104 and incorporates the avatar into graphical user interfaces of the third-party application 105 implemented on the client device 103.

Figure 5:
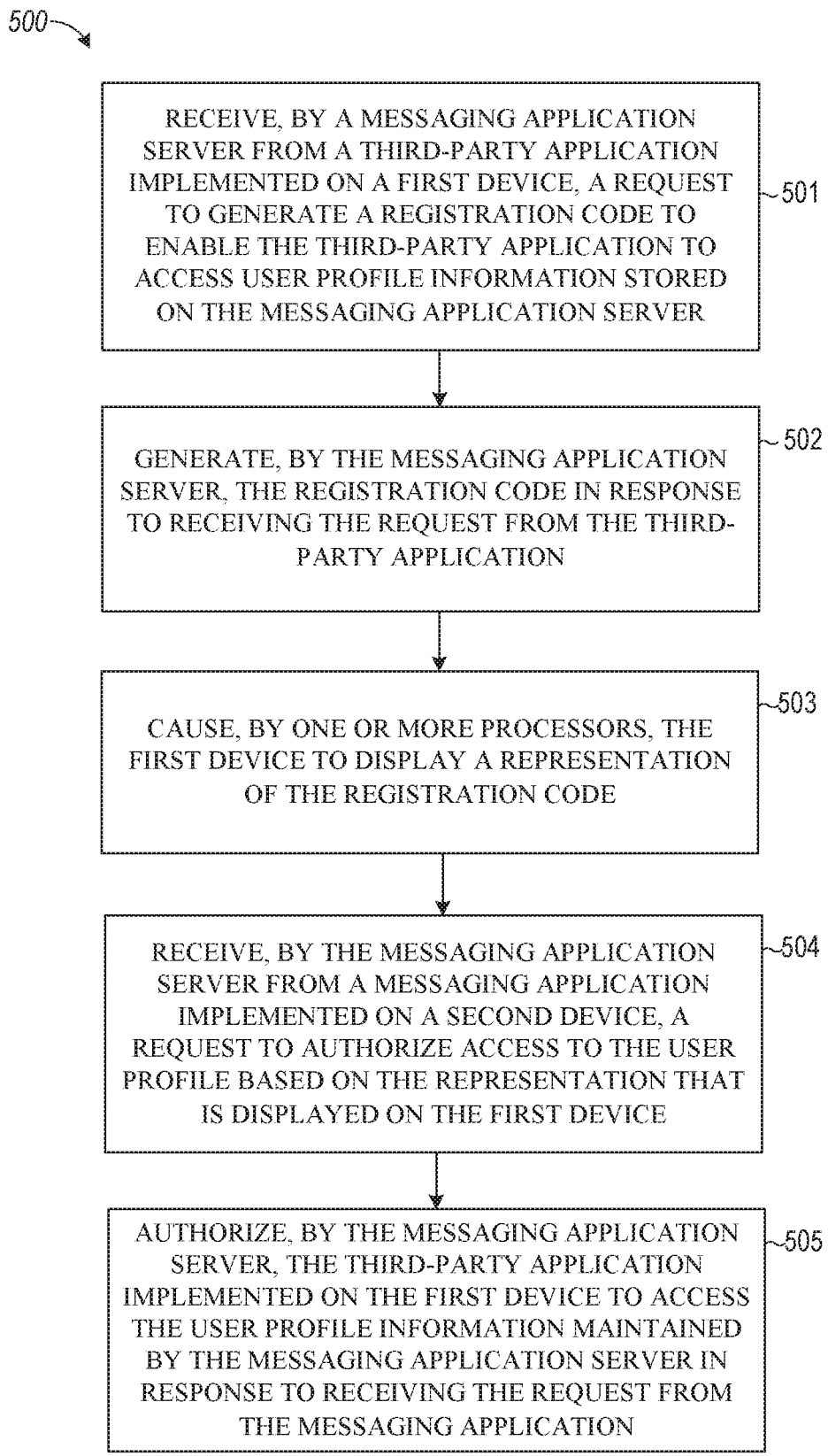
FIGS. 5 and 6 are flowcharts illustrating example operations of the scan based authorization system, according to example embodiments.

FIG. 5 is a flowchart illustrating example operations of the scan based authorization system 124 in performing process 500, according to example embodiments. The process 500 may be embodied in computer-readable instructions for execution by one or more processors such that the operations of the process 500 may be performed in part or in whole by the functional components of the messaging server system 108, third-party application server 107, and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the scan based authorization system 124 receives, a messaging application server from a third-party application implemented on a first device, a request to generate a registration code to enable the third-party application to access user profile information stored on the messaging application server.

At operation 502, the scan based authorization system 124 generates, by the messaging application server, the registration code in response to receiving the request from the third-party application.

At operation 503, the scan based authorization system 124 causes, by one or more processors, the first device to display a representation of the registration code.

At operation 504, the scan based authorization system 124 receives, by the messaging application server from a messaging application implemented on a second device, a request to authorize access to the user profile based on the representation that is displayed on the first device.

At operation 505, the scan based authorization system 124 authorizes, by the messaging application server, the third-party application implemented on the first device to access the user profile information maintained by the messaging application server in response to receiving the request from the messaging application.

Figure 6:
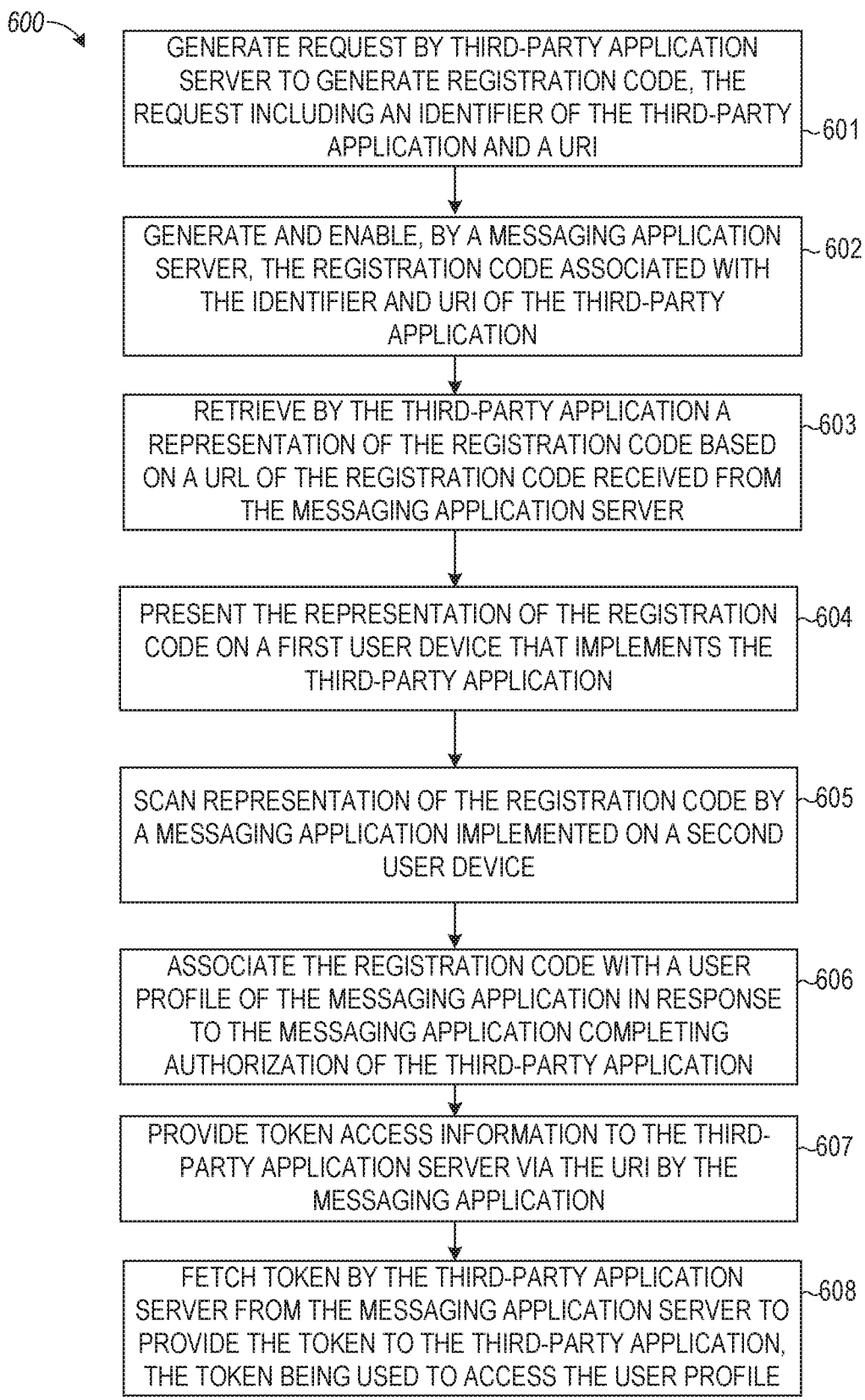

FIG. 6 is a flowchart illustrating example operations of the scan based authorization system 124 in performing process 600, according to example embodiments. The process 600 may be embodied in computer-readable instructions for execution by one or more processors such that the operations of the process 600 may be performed in part or in whole by the functional components of the messaging server system 108, third-party application server 107, and/or third-party application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the third-party application server 107 generates a request to generate a registration code, with the request including an identifier of the third-party application and a URI of the third-party application server 107.

At operation 602, the scan based authorization system 124 generates and enables, by the messaging application server, the registration code associated with the identifier and URI of the third-party application 105 and/or third-party application server 107.

At operation 603, the third-party application server 107 retrieves a representation of the registration code based on a URL of the registration code received from the scan based authorization system 124 or messaging application server.

At operation 604, the third-party application server 107 instructs the third-party application 105 implemented on client device 103 to present the representation of the registration code on the first user device (e.g., client device 103).

At operation 605, the messaging client application 104 implemented on a second user device (e.g., the client device 102) scans (captures an image or video and decodes the URL of) the representation of the registration code.

At operation 606, the scan based authorization system 124 associates the registration code with a user profile of the messaging client application 104 in response to the messaging client application 104 completing an authorization of the third-party application 105 implemented on client device 103.

At operation 607, the messaging client application 104 provides token access information (e.g., token authorization information and/or access credentials) to the third-party application server 107 via the URI of the third-party application server 107.

At operation 608, the third-party application server 107 fetches the authorization token from the messaging application server to provide the authorization token to the third-party application 105 implemented on client device 103. The third-party application 105 implemented on client device 103 uses the authorization token to access a user profile of the user of the messaging client application 104 and to retrieve portions of the user profile to incorporate into a user interface of the third-party application 105 implemented on client device 103.

Figure 7:
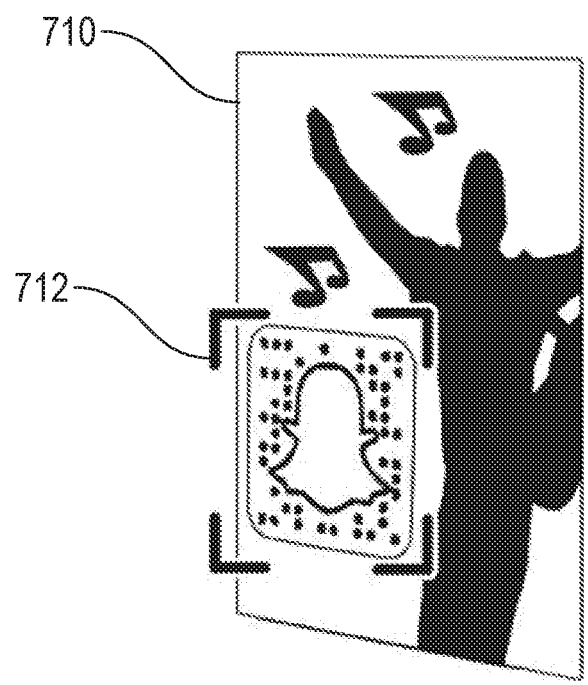
FIGS. 7 and 8 are illustrative inputs and outputs of the scan based authorization system, according to example embodiments.
Figure 8:
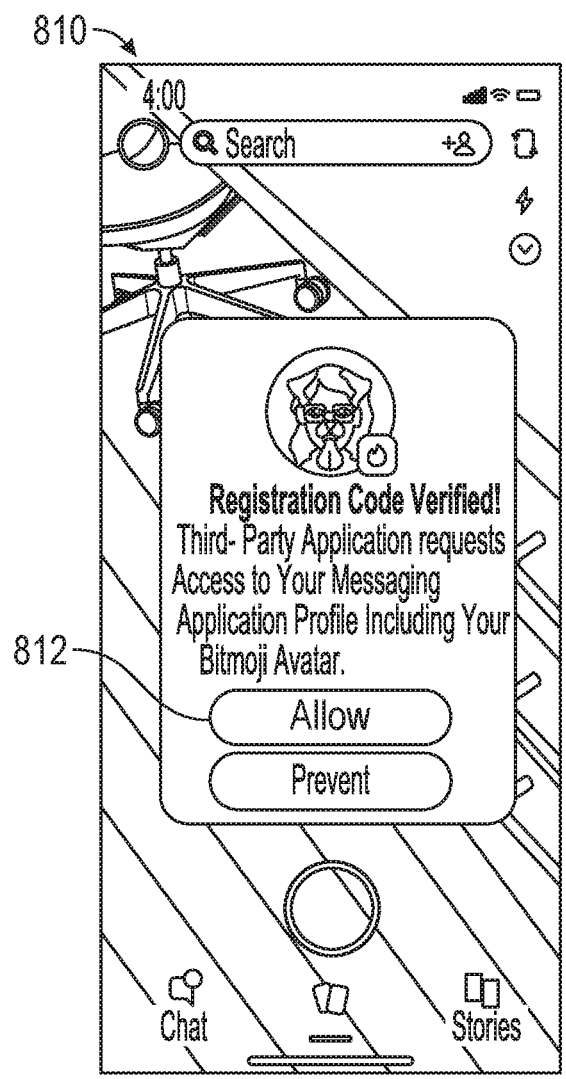

FIGS. 7 and 8 are illustrative inputs and outputs of the scan based authorization system 124, according to example embodiments. As shown in FIG. 7, third-party application 105 implemented on client device 103 may present a graphical user interface screen 710. For example, the screen 710 may be a welcome screen or some other screen of a gaming application. The third-party application 105 implemented on client device 103 incorporates into the screen 710 a representation 712 of a registration code received from the scan based authorization system 124. Specifically, the third-party application 105 implemented on client device 103 may access a URL of the registration code and download the representation 712 for presentation on a display, such as a television.

After a user captures an image of the representation 712 with the messaging client application 104 implemented on the client device 102, the messaging client application 104 decodes the representation to obtain the URI, of the representation. The messaging client application 104 communicates with the scan based authorization system 124 using the URL, to begin an authorization process for authorizing the third-party application 105 implemented on client device 103 to access the user profile of the user of the messaging client application 104. Specifically, the scan based authorization system 124 obtains an identifier of the third-party application 105 implemented on client device 103 and provides a confirmation screen to a user in a graphical user interface 810 (FIG. 8) of the messaging client application 104. The confirmation screen includes an indication that the URL and/or representation that the user scanned (captured an image of) has been validated (e.g., matches an active registration code that is stored by the scan based authorization system 124).

The confirmation screen identifies to the user the third-party application 105 implemented on client device 103 using the retrieved identifier. The confirmation screen indicates that the third-party application 105 implemented on client device 103 requests access to the user profile information (e.g., an avatar) of the user maintained by the messaging client application 104. The confirmation screen includes an allow option 812 to confirm and authorize the third-party application 105 implemented on client device 103 to access the identified user profile information, if the user selects a prevent option, the registration code is invalidated and access to the user profile is not authorized for the third-party application 105 implemented on client device 103. Once the user selects the allow option 812, the messaging client application 104 communicates with the scan based authorization system 124 to obtain an authorization token and provides authorization information associated with the token to the third-party application server 107. The third-party application server 107 then retrieves the token and provides the authorization token to the third-party application 105 implemented on client device 103. The third-party application 105 implemented on client device 103 uses the token to access, retrieve, and incorporate into its graphical user interface the user profile information of the user of the messaging client application 104.

Figure 9:
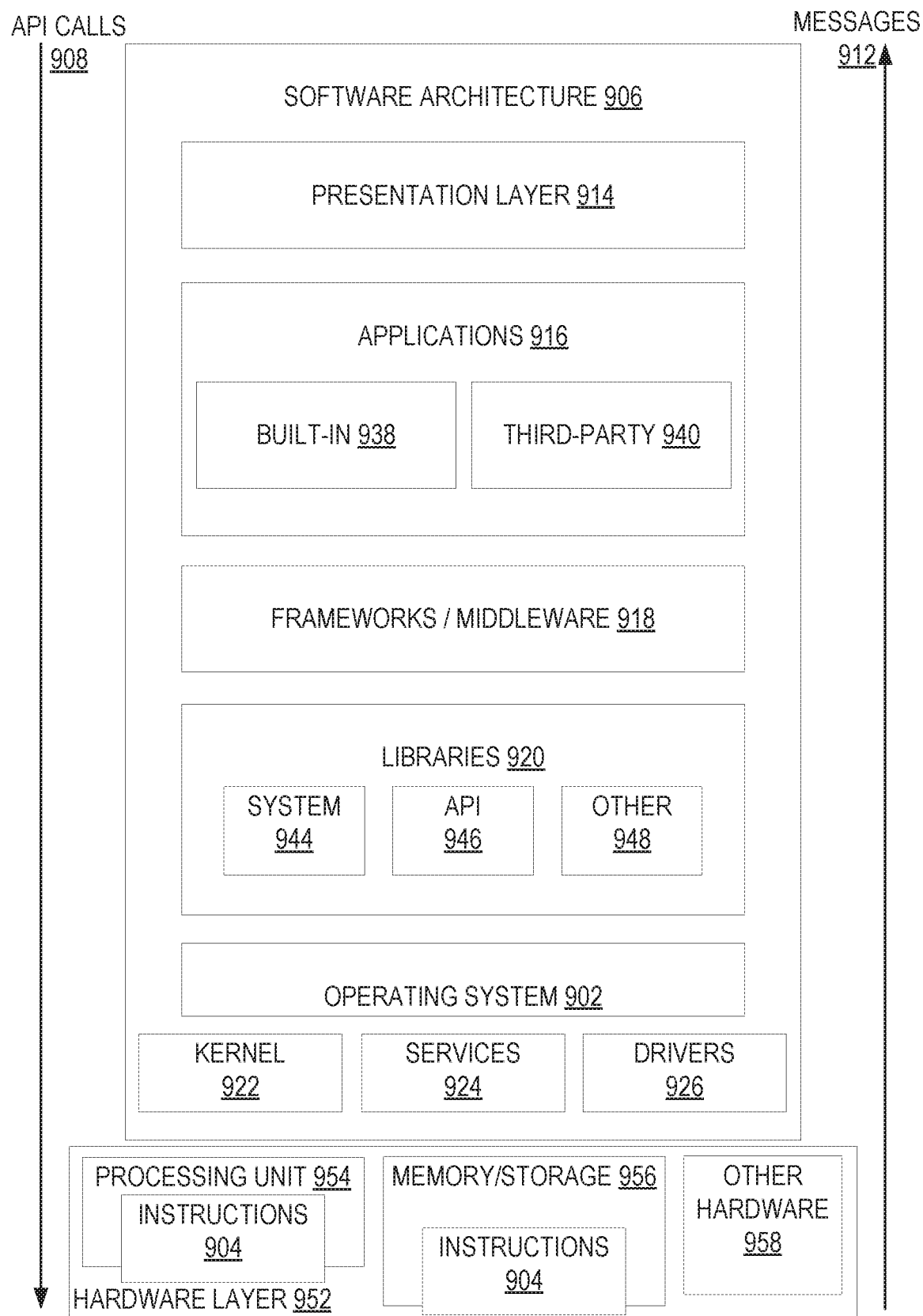
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
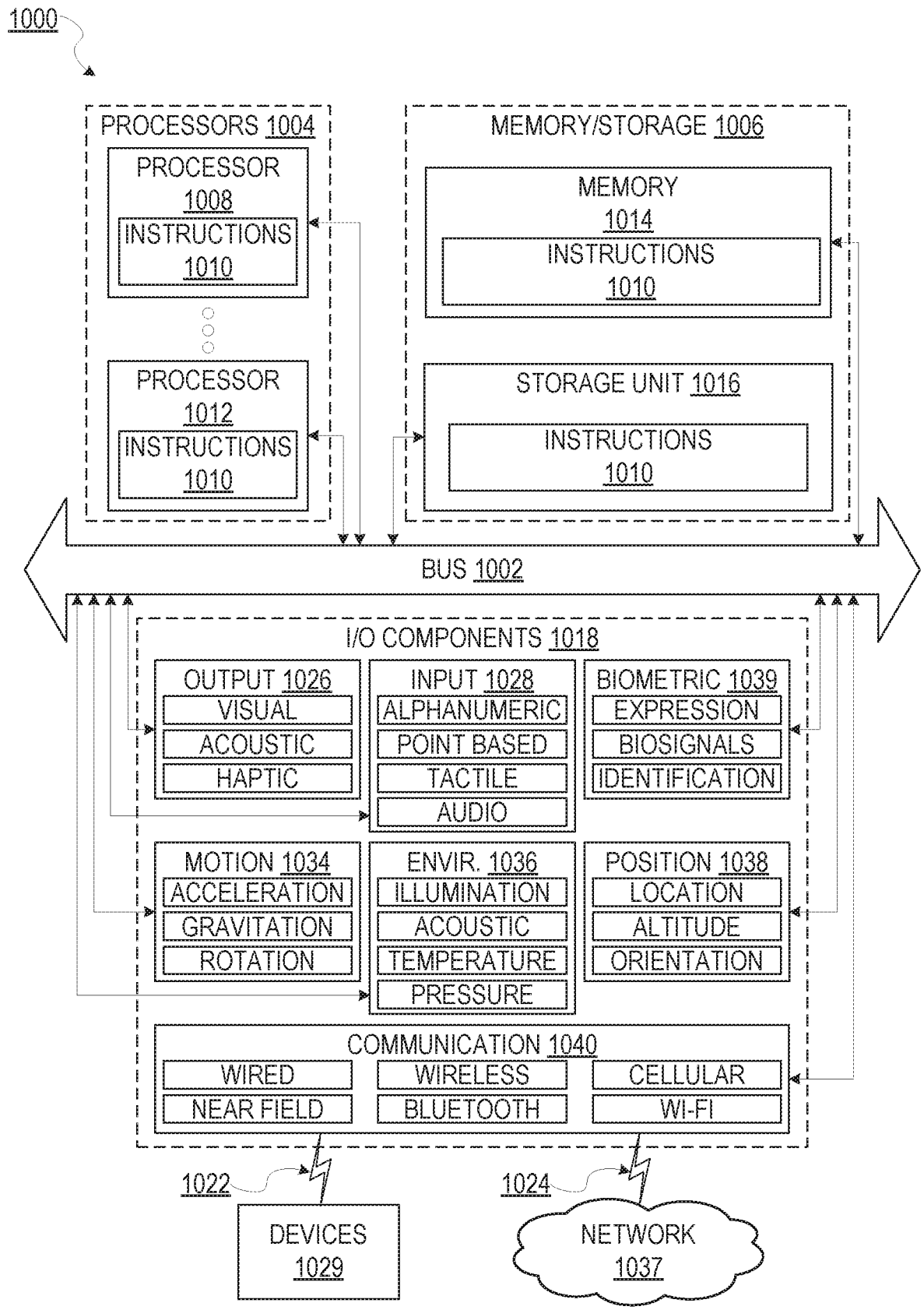
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a UPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information) The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RMC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by a messaging application server from a third-party application implemented on a first device, a request to generate a registration code to enable the third-party application to access user profile information stored on the messaging application server;
   generating, by the messaging application server, the registration code in response to receiving the request from the third-party application;
   causing, by one or more processors, the first device to display a representation of the registration code;
   receiving, by the messaging application server from a messaging application implemented on a second device, a request to authorize access to the user profile based on the representation that is displayed on the first device; and
   authorizing, by the messaging application server, the third-party application implemented on the first device to access the user profile information maintained by the messaging application server in response to receiving the request from the messaging application.

2. The method of claim 1, wherein the request comprises an identifier of the third-party application and a redirect universal resource identifier (URI).

3. The method of claim 1, wherein generating the registration code comprises:
   generating a graphic associated with a universal resource locator (URL) and a universal resource identifier (URI) of the third-party application; and
   activating the registration code.

4. The method of claim 3, further comprising transmitting, by the messaging application server, the URL for the graphic to the third-party application.

5. The method of claim 3, wherein causing the first device to display the representation of the registration code comprises:
   transmitting the URL to the first device;
   accessing the URL by the first device to download the graphic associated with the URL; and
   presenting the downloaded graphic on a display device of the first device.

6. The method of claim 5, wherein the first device is a gaming console, wherein the second device is a mobile device; and
   wherein the display device comprises a television.

7. The method of claim 1, wherein a user associated with the user profile is currently logged into the messaging application implemented on the second device, further comprising:
   capturing, by the second device, an image of the representation displayed by the first device;
   accessing, by the messaging application, a universal resource locator (URL) associated with the representation in response to capturing the image;
   retrieving an identifier of the third-party application based on accessing the URL;
   presenting the identifier of the third-party application to a user of the messaging application.

8. The method of claim 7, further comprising receiving user input authorizing the third-party application in accordance with the OAuth 2.0 framework based on the presented identifier, the authorizing comprising associating the user profile with the registration code.

9. The method of claim 8, further comprising:
receiving, by the messaging application, a universal resource identifier (URI) of the third-party application associated with the URL;
transmitting by the messaging application a communication to a server of the third-party application using the URI of the third-party application; and
in response to the server of the third-party application receiving the communication from the messaging application, receiving, by the server of the third-party application, an access token that enables access to the user profile from the messaging application server, wherein the server provides the access token to the third-party application.

10. The method of claim 9, further comprising transmitting by the messaging application a request to invalidate or delete the registration code stored on the messaging application server after the third-party application is authorized.

11. The method of claim 9, further comprising retrieving, by the third-party application, the user profile information from the messaging application server using the access token.

12. The method of claim 11, wherein the user profile information includes an avatar of a user of the messaging application.

13. The method of claim 12, wherein the avatar is specific to be displayed on a gaining application.

14. The method of claim 11, further comprising incorporating the retrieved user profile information into the third-party application.

15. The method of claim 9, wherein the token is valid for a predetermined period of time.

16. The method of claim 15, wherein the third-party application refreshes the token to maintain validity of the token within the predetermined period of time.

17. The method of claim 9, further comprising transmitting the access token from the third-party application to the first device to enable the first device to access the user profile.

18. A system comprising:
a processor configured to perform operations comprising:
receiving, by a messaging application server from a third-party application implemented on a first device, a request to generate a registration code to enable the third-party application to access user profile information stored on the messaging application server;
generating, by the messaging application server, the registration code in response to receiving the request from the third-party application;
causing, by one or more processors, the first device to display a representation of the registration code;
receiving, by the messaging application server from a messaging application implemented on a second device, a request to authorize access to the user profile based on the representation that is displayed on the first device; and
authorizing, by the messaging application server, the third-party application implemented on the first device to access the user profile information maintained by the messaging application server in response to receiving the request from the messaging application.

19. A non-transitory machine-readable storage medium that includes instructions that, when executed by one or more processors of a machine, cause the machine to perform operations comprising:
receiving, by a messaging application server from a third-party application implemented on a first device, a request to generate a registration code to enable the third-party application to access user profile information stored on the messaging application server;
generating, by the messaging application server, the registration code in response to receiving the request from the third-party application;
causing, by one or more processors, the first device to display a representation of the registration code;
receiving, by the messaging application server from a messaging application implemented on a second device, a request to authorize access to the user profile based on the representation that is displayed on the first device; and
authorizing, by the messaging application server, the third-party application implemented on the first device to access the user profile information maintained by the messaging application server in response to receiving the request from the messaging application.

* * * * *

UNITED STATES PATENT AND TRADEMARK OFFICE
CERTIFICATE OF CORRECTION

PATENT NO. : 11,233,799 B1
APPLICATION NO. : 16/798053
DATED : January 25, 2022
INVENTOR(S) : Whyte et al.

Page 1 of 1

It is certified that error appears in the above-identified patent and that said Letters Patent is hereby corrected as shown below:

On the Title Page

In item (57), in "Abstract", in Column 2, Line 16, delete "by," and insert --by-- therefor In the Claims In Column 25, Line 27, in Claim 13, delete "gaining" and insert --gaming-- therefor Signed and Sealed this
Seventh Day of November, 2023

Katherine Kelly Vidal
*Director of the United States Patent and Trademark Office*